(12) United States Patent
Scheideler et al.

(10) Patent No.: US 10,754,963 B2
(45) Date of Patent: Aug. 25, 2020

(54) SECURE ZONES IN KNOWLEDGE GRAPH

(71) Applicant: International Business Machines Corporation, Armonk, NY (US)

(72) Inventors: Tim U. Scheideler, Schoenenberg (CH); Florian Graf, Zurich (CH); Erik Rueger, Ockenheim (DE); Marc Albrecht, Hamburg (DE)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 15/904,531

(22) Filed: Feb. 26, 2018

(65) Prior Publication Data

US 2019/0266336 A1     Aug. 29, 2019

(51) Int. Cl.
*G06F 21/60* (2013.01)
*G06N 5/02* (2006.01)
*G06F 21/62* (2013.01)

(52) U.S. Cl.
CPC ........ *G06F 21/604* (2013.01); *G06F 21/6218* (2013.01); *G06F 21/6227* (2013.01); *G06N 5/02* (2013.01)

(58) Field of Classification Search
CPC .............. G06F 21/604; G06F 21/6218; G06F 21/6227; G06F 2221/2141; G06N 5/02; G06N 5/022
USPC ......................................................... 726/27
See application file for complete search history.

(56) References Cited

U.S. PATENT DOCUMENTS

2014/0250140 A1* 9/2014 Guzenda ................. G06F 16/28
                                                                        707/758
2015/0095319 A1    4/2015 Ormont et al.
2016/0203327 A1* 7/2016 Akkiraju ............. G06F 16/9024
                                                                        707/785
2016/0350307 A1    12/2016 Verweyst et al.
2016/0352743 A1    12/2016 Verweyst et al.
(Continued)

FOREIGN PATENT DOCUMENTS

EP          3086189 A2      10/2016
WO    2016191070 A1      12/2016
WO    2016191081 A1      12/2016

OTHER PUBLICATIONS

Galkin et al., "Enterprise Knowledge Graphs: A Backbone of Linked Enterprise Data", 2016 IEEE/WIC/ACM International Conference on Web Intelligence, DOI 10.1109/WI.2016.82, Oct. 2016, 6 pages.

(Continued)

*Primary Examiner* — Mohammad W Reza
(74) *Attorney, Agent, or Firm* — Peter J. Edwards

(57) ABSTRACT

Access in a knowledge graph, comprising nodes and edges connecting two or more nodes, is controlled by assigning each node to a non-intersecting zone. A first and second zone identifier, each indicative of a zone occupied by a node where an edge ends, are each stored. Determining an access graph comprising an access node for each zone, access edges representing edges between the zones, and a first list of the zones. Each entry in the first list relates to a zone and a second list of node identifiers, each indicative of a node occupying the zone. A first and second access control list, each related to a zone where an access edge ends and to which a access node in the access graph relates, are stored in each access edge.

19 Claims, 10 Drawing Sheets

(56) References Cited

U.S. PATENT DOCUMENTS

| | | |
|---|---|---|
| 2016/0371288 A1 | 12/2016 | Le Biannic et al. |
| 2016/0371395 A1 | 12/2016 | Dumant et al. |
| 2016/0373423 A1 | 12/2016 | Naibo |
| 2016/0373456 A1 | 12/2016 | Vermeulen et al. |
| 2017/0024375 A1 | 1/2017 | Hakkani-Tur et al. |
| 2018/0330106 A1* | 11/2018 | Douceur ............... G06F 16/122 |

OTHER PUBLICATIONS

Webber et al., "Graph Databases in the Enterprise: Identity & Access Management", Neo4j Blog, Nov. 2, 2015, 5 pages.

* cited by examiner

US 10,754,963 B2

SECURE ZONES IN KNOWLEDGE GRAPH

BACKGROUND

The present disclosure relates generally to controlling access in a knowledge graph and, more specifically, to managing a knowledge graph using secure zones.

The management of data, especially unstructured data, continues to be a concern for enterprises. It can be important to store and manage data in a way that allows quick and reliable access. Recently, cognitive computing knowledge graphs have been used to store and process information. A knowledge graph consists of data, which may be collected from various sources inside and outside the enterprise, stored on the nodes of a mesh of the knowledge graph. The nodes are typically connected via edges (or "links") representing the relationship between individual nodes.

Knowledge graphs may consist of several thousand nodes between which selected relationships exist. However, not every user having access to the knowledge graph (e.g., through the use of a search engine) may have access to all the data stored in the nodes. Typically, an access control list (ACL) may be used for controlling access to resources.

SUMMARY

According to embodiments of the present disclosure, a method for controlling access in a knowledge graph is provided. The knowledge graph comprises nodes and related images. Edges of the graph connect two or more nodes. The method comprises assigning each node in a knowledge graph to a zone of one or more non-intersecting zones and storing a first zone identifier indicative of a first zone occupied by a first node where an edge ends and a second zone identifier indicative of a second zone occupied by a second node where the edge ends.

Furthermore, the method may comprise additionally determining an access graph comprising an access node for each zone and access edges representing one or more edges between the one or more non-intersecting zones. The access graph may further comprise a first list of the one or more non-intersecting zones. Each entry in the first list may be related to a zone and a second list of node identifiers, each node identifier indicative of a node in the knowledge graph occupying the zone. A first access control list and a second access control list may be stored in each access edge. The first access control list may relate to a first zone where an access edge ends and to which a first access node in the access graph relates and the second access control list may relate to a second zone where the access edge ends to which a second access node in said access graph relates.

A computing system and computer program product can embody the method and structures of the disclosure. The computing system can comprise a network, a memory configured to store a knowledge graph and an access graph, and a processor in communication with the memory. The computing system can be configured to perform the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
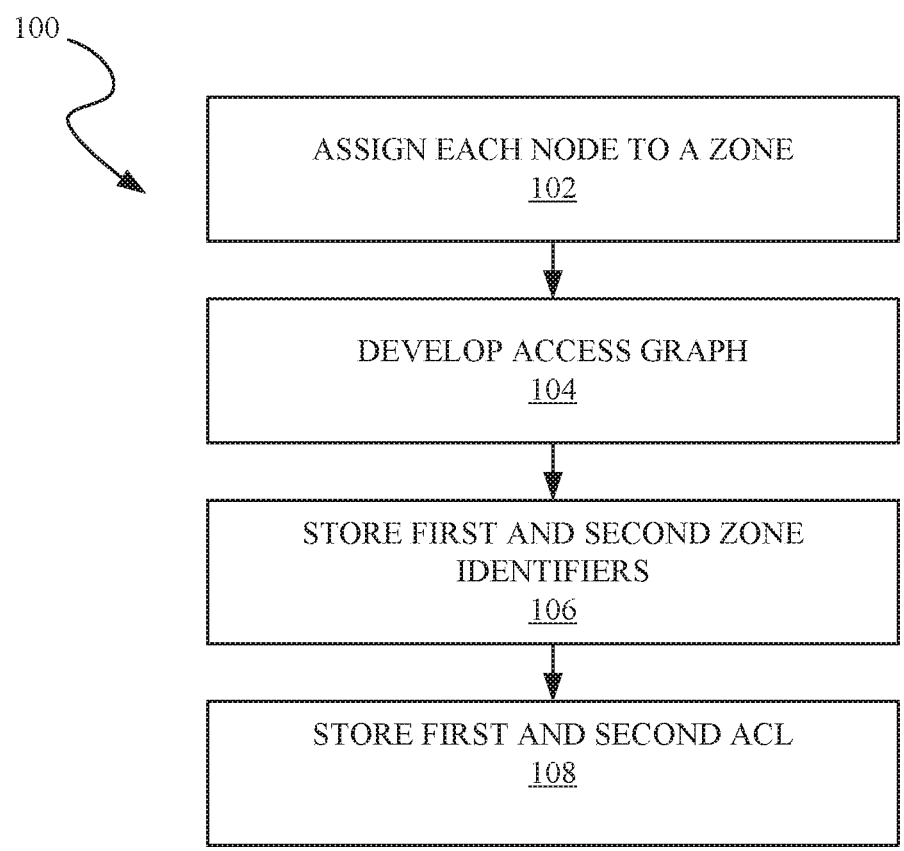
FIG. 1 shows a block diagram of an embodiment of the method for controlling access in a knowledge graph, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to knowledge graphs, and more particular aspects relate to controlling access to a knowledge graph. While the present disclosure is not necessarily limited to such applications, various aspects of the disclosure may be appreciated through a discussion of various examples using this context.

In the context of this description, the following conventions, terms and/or expressions may be used:

The term 'controlling access' may denote granting or denying read or write (or delete) access to a data structure, e.g., a node in a knowledge graph. The access right may be managed using metadata relating to the data structure. In case of an attempted access to the data structure, the metadata will be checked first for whether access is allowed for a certain user or a process. Typically, if no access right exists an error message or an interrupt may be generated.

The term 'knowledge graph' may denote a networked data structure comprising data—represented in nodes—and edges—representing connections or links between the nodes. Thus, the knowledge graph may represent a knowledge base for an organization of so-called unstructured data, i.e., facts, and their semantic relationships. Knowledge graphs are often used by search engines.

The term 'non-intersecting zones' may denote that different zones may not have crossing boundaries.

The term 'access graph' may denote a knowledge graph structure representing links between groups of nodes in an underlying fact-based knowledge graph. The access graph may control an access to nodes in the knowledge graph. ACLs may be managed here.

The term 'zone identifier' may denote a unique identifier for a zone in which nodes of the knowledge graph are present. It may be noted that IDs of the nodes of a complex knowledge graph may be non-unique. However, it may be useful if the nodes within one zone may have unique IDs.

The term 'access node' may denote a node in the access graph. The access node may represent a plurality of nodes in the underlying knowledge graph.

The term 'access edges' may denote an edge in the access graph. One access edge may represent a plurality of edges between zones in the underlying knowledge graph.

The term 'access control list' may denote a list of users and/or processes for which access is granted to a specific resource, e.g., a data structure like a node of a knowledge graph or, a physical resource of the computer system. Such an ACL may exist per resource or in form of a joint ACL for a plurality of resources.

The term 'target node' may denote a node in a knowledge graph that should be reached via an edge starting from another node.

The term 'zone border' or 'zone boundary' may denote an imaginary wall around a plurality of nodes. Nodes of one zone may represent a group of resources to which the same access rights relate.

The proposed method for controlling access in a knowledge graph may offer multiple advantages and technical effects:

The disclosed method, as well as the related system, may enhance the structure of a knowledge graph significantly, thus allowing more fine-grained and elegant access management to individual nodes. The structure of the knowledge graph may thereby be taken into account in such a way that computing resources are not wasted, no error messages are generated because of un-allowed attempted access, and a user may have fast access to the data stored in the nodes the user is allowed to access.

Additionally, the storage requirement for metadata—in particular for ACLs—on a node level may be reduced significantly. The metadata associated with the content in the knowledge graph may also comprise the ACL, e.g., a user's or group of users' permission to access a certain content item in a node. An un-allowed access may result in an error message. ACLs have typically been implemented on node level. One result of such an approach may be the fact that a search engine may crawl through the knowledge graph to find the right nodes, but in the end determine that the user may not access a certain node or a group of nodes. Consequently, this approach is prone to wasting valuable resources, such as CPU power, memory bandwidth, etc.

Using the disclosed method and system, since all the nodes may be classified into specific access zones which may have a central access control in the form of an access graph, the management and control of access rights of the knowledge graph may be controlled by an additional structure denoted as 'access graph.' Thus, the sophisticated method of organizing facts and information in the form of a knowledge graph is also applied to the management of the knowledge graph itself. The new organization of the ACLs is done centrally in the access graph, which may reduce the effort to have access control lists available for every single node.

The enhanced metadata—i.e., dedicated data structure—of the edges has information about an affiliation of a node to a specific zone. When an attempt is made to access a node in a second zone starting from a node of first zone, the system and/or method goes up one level—from the basic structure of the knowledge graph to the access graph—in order to determine the permission, e.g., the access rights, to the node in the new zone.

Furthermore, the management of the links in the access graph may be fully automated and no manual management actions may be required to maintain the access graph in addition to the knowledge graph. From a user perspective, the proposed method for controlling access in the knowledge graph is completely transparent. For example, a user does not need to care about access restrictions and does not receive any error messages due to an un-allowed access to nodes where the user does not have access permission.

As a consequence, management of even larger knowledge graphs, such as the knowledge graphs with many multiples of nodes typically used today, becomes feasible and the management overhead in terms of manual management activities, e.g., storage requirements and required computing power, may be reduced significantly.

Additional embodiments of the method, which may also be applicable to the related system, will be presented below:

According to one preferred embodiment, the method also comprises determining an access right to a target node if the related knowledge graph edge crosses a zone border. The access right to the target node of the knowledge graph may be found by referring to the corresponding access control list stored in the access edge of the access graph relating to the zone the target node of the knowledge graph occupies. Thus, if an edge in a knowledge graph crosses a border between zones, the process underlying the method may go up one level to the access graph and determine the access right to the target node in the lower level (the knowledge graph). In this way, a determination of access control lists for each and every node may be eliminated, enhancing access speed from one node to another node of the same zone and reducing the storage requirements for the ACL relating to each node.

According to one advantageous embodiment of the method, adding a new node to the knowledge graph may comprise, upon determining that all nodes relating to the edges relating to the new node belong to the same zone, adding the node identifier indicative of the new node to the list of nodes of the same zone. No further action may be required.

It may also be noted that adding a new edge between two nodes of the same zone in the knowledge graph may not require an access to the access graph. No overhead may be generated.

According to one additionally advantageous embodiment, the method may also comprise, upon determining that a new edge of the new node crosses a zone border to another zone, adding an access edge to the access graph if no access edge exists between the zone of the new node with the new edge and another zone (or to an access node relating to the other zone). Thus, edges or links may be added automatically to the access graph if changes to edges are made in the underlying knowledge graph.

It may also be noted that upon determining that an edge of a node to be removed from the knowledge graph is the last edge between the zone of the node to be removed and another zone, the corresponding access edge of the access graph may also be removed automatically and transparently.

According to another embodiment, the method also comprises, upon determining that an edge to be removed from the knowledge graph may be the last edge between two zones, removing the corresponding access edge of the access graph between an access node representing a first of the two zones and another access node representing the second of the two zones.

It may also be noted that if an access node in the access graph no longer has any edges, the access node may also be removed from the access graph.

According to a further embodiment of the method, one zone may be surrounded by another zone. Consequently, a hierarchical access process to nodes may be implemented by the proposed method easily. No further control structures may be required.

According to another embodiment of the method, one access edge may be related to a plurality of edges, of the knowledge graph, between nodes of two zones. This may be seen as a standard implementation.

According to a further advantageous embodiment of the method, a change in a structure of the knowledge, e.g., moving an edge, may be treated as a removal of an edge and an adding of an edge. Thus, more complex changes to the knowledge graph may be broken down to more simple actions.

According to a further embodiment of the method, the data structure relating to an edge may comprise a weight factor value. The weight factor value may be indicative of a strength factor of an edge. Hence, also other known technologies and implementation options may be combined with the proposed method.

According to another advantageous embodiment, the method may further comprise, upon determining no access rights to a target node exist, starting from a starting node connected via an edge to the target node, accessing another node via another edge with the next lowest cost points compared to the cost points of the edge to the target node for which no access rights exist according to a cost function using the weights of the related edges. Thus, error messages due to permission denials may not be generated and the process underlying the method may automatically look for alternative edges to other nodes following permissive connections, e.g., edges or links, in the knowledge graph.

In the following, a detailed description of the figures will be given. All instructions in the figures are schematic. Firstly, a block diagram of an embodiment of the inventive method for controlling access in a knowledge graph is given.

Afterwards, further embodiments, as well as embodiments of the system for controlling access in a knowledge graph, will be described.

Referring now to FIG. 1, depicted is a block diagram of an embodiment of the method 100 for controlling access in a knowledge graph. The knowledge graph comprises nodes and edges, with the edges connecting the nodes. The method 100 comprises assigning, at operation 102, each one of the nodes of the knowledge graph to one of several non-intersecting zones, and determining, at operation 104, an access graph comprising a list of all zones of the knowledge graph. Thereby, each list entry is related to one zone and to a list of zone-related node identifiers, indicative of nodes being assigned to the one zone, such that one zone comprises one or more of the nodes with individual access rights.

The method 100 further comprises storing, at operation 106, in a dataset relating to an edge of a knowledge graph, a first zone identifier, indicative of a first zone where the edge ends, and a second zone identifier, indicative of a second zone where the edge ends. The access graph, in contrast to the knowledge graph, comprises one access node for each zone and access edges representing one or more edges between respective zones of the knowledge graph. Additionally, the weight of the edge may be stored in the dataset of the edge of the knowledge graph. Thus, the access node in the access graph represents one or more nodes in the knowledge graph and an access edge may represent several edges which connect nodes of two or more zones in the knowledge graph.

Furthermore, the method 100 comprises storing, at operation 108, a first access control list and a second access control list in each access edge of the access graph. The first access control list relating to a first access node the access edge connects to and the second access control list relating to a second access node to which the access edge connects. The first and second access nodes may each be associated with a different zone, such that the first and second access control lists each relate to a different zone of the knowledge graph.

Figure 2:
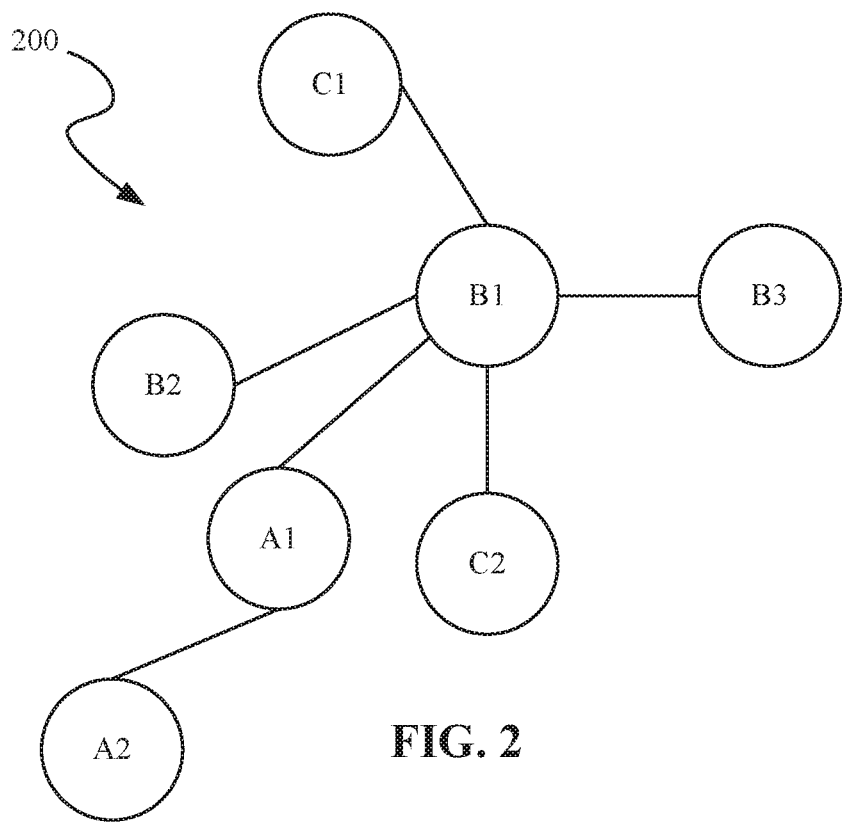
FIG. 2 shows a block diagram of a traditional knowledge graph with access control on node level.

FIG. 2 shows a block diagram of a traditional knowledge graph 200 with access control on a node level. In this example, three access groups A, B, and C are defined allowing to access the nodes (A1, A2), (B1, B2, B3), and (C1, C2) respectively. Access control on the node level does not utilize, and therefore does not take advantage of, the structure of a knowledge graph. Operations following the paths along the edges (e.g., core operations) are performed independently of access control operations, as these are performed on a node level. An example for this traditional technology is the search operation which runs through the graph collecting data, only to potentially discover that the requester lacks the required access rights to a major part of the collected information.

Figure 3:
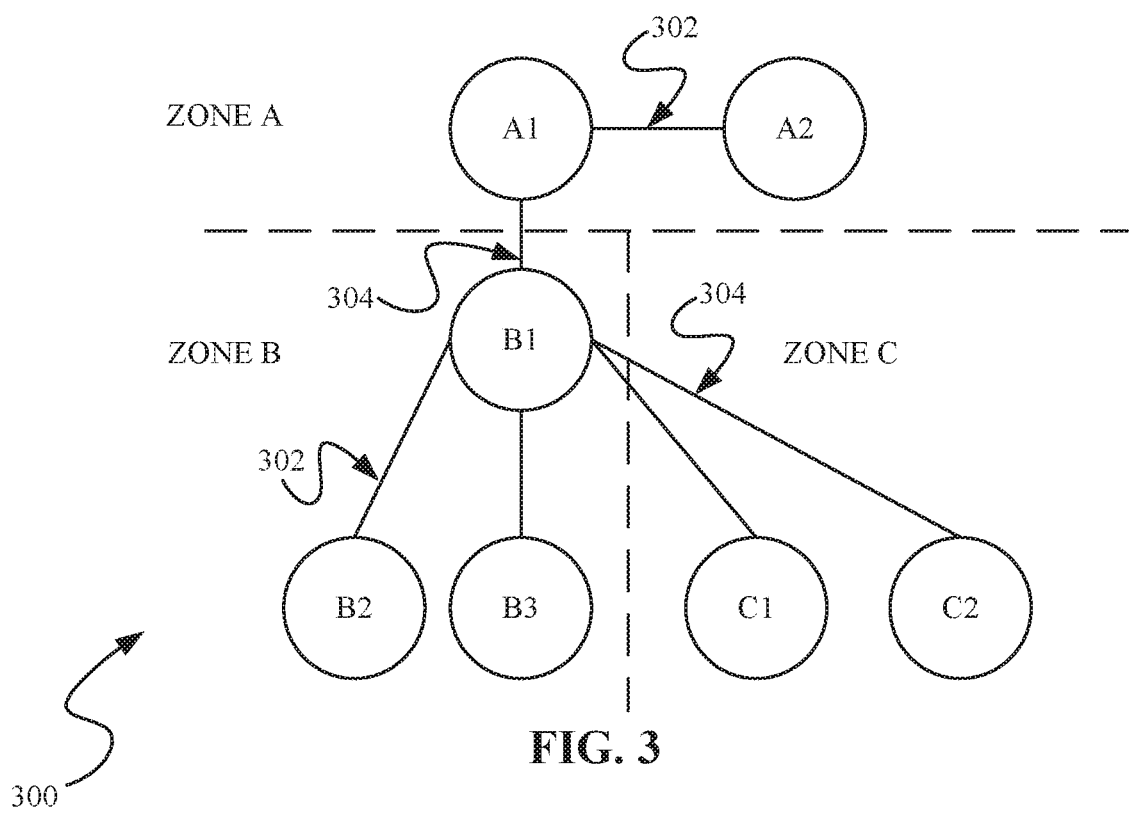
FIG. 3 shows a block diagram of an enhanced knowledge graph with access control on group or zone level.

FIG. 3 shows a block diagram 300 of an enhanced knowledge graph with access control on a group or zone level. Here, the access control is implemented using the edges of the knowledge graph, which represents an alternative implementation of the method proposed herein. The nodes are located in three distinct zones (A, B, and C) representing the three access groups A, B, and C. Such a system contains two kinds of edges: (a) edges located entirely in one zone 302 and (b) edges traversing zone boundaries 304.

In addition to existing data (e.g., weight of an edge), the zone information is stored, with the beginning and the end independent of any direction, in a data structure related to the edge: either two identical zone IDs (edges located entirely in one zone 302) or two different zone IDs (edges traversing zone boundaries 304).

Figure 4:
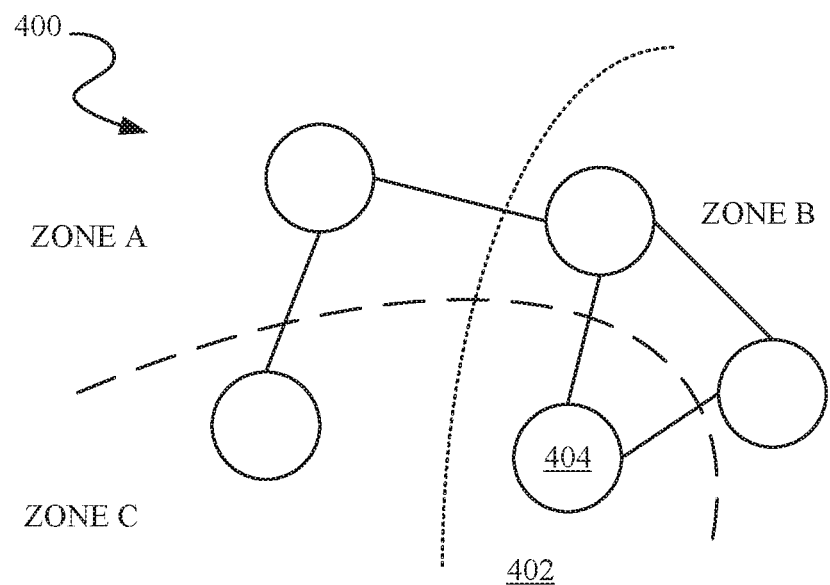
FIG. 4 shows a block diagram of an embodiment of a knowledge graph with overlapping zones.

FIG. 4 shows a block diagram 400 of an example of a knowledge graph with overlapping zones. In this example, node 404 of the lower right triangle of nodes lies in both zone C and zone B—compare overlap 402. This should not happen. A reorganization of nodes is required, as shown in the next figure.

Figure 5:
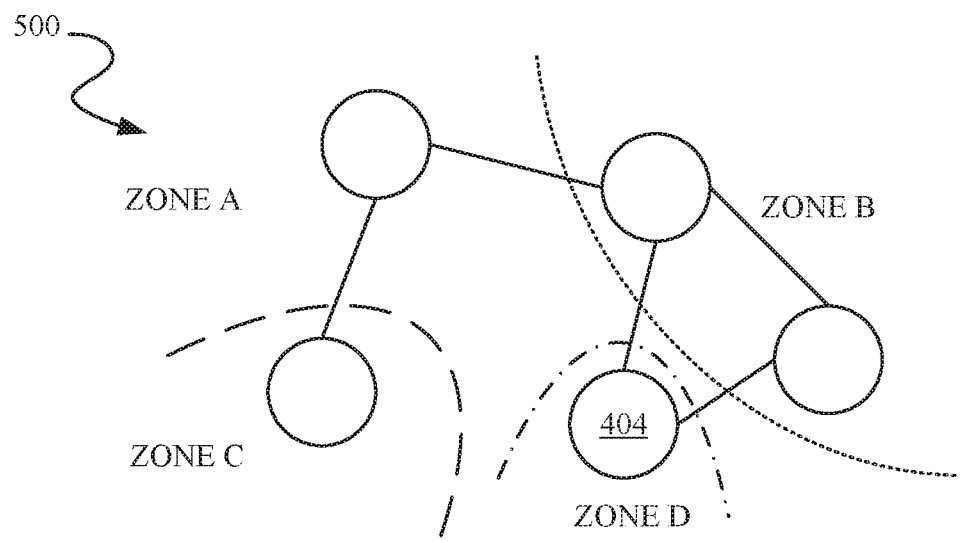
FIG. 5 shows a block diagram of an embodiment of a knowledge graph with reorganized non-overlapping zones, according to embodiments of the present disclosure.

FIG. 5 shows a block diagram 500 of an embodiment of a knowledge graph with reorganized zones. Referring back to FIG. 4, and in case a node requires access rights of type "B" and of type "C", an additional zone D must be created, where node 404 now lies.

Figure 6:
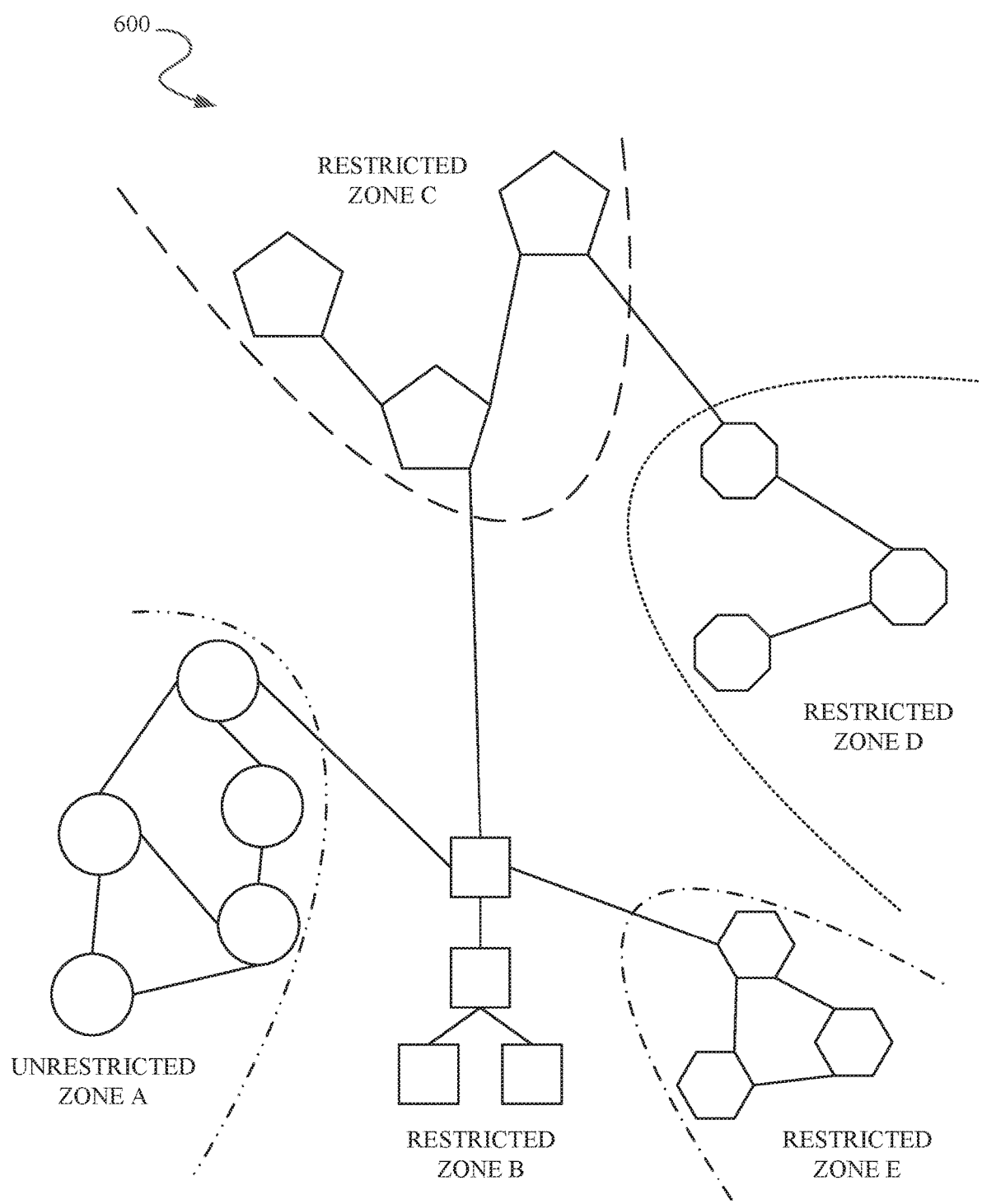
FIG. 6 shows a block diagram of an embodiment of a knowledge graph with a plurality of nodes in different restricted and unrestricted zones, according to embodiments of the present disclosure.

FIG. 6 shows a block diagram of an embodiment of a knowledge graph 600 with a plurality of nodes in different restricted and unrestricted zones. The following assumptions are made for the structure of a knowledge graph: (a) each node is placed in exactly one security zone so that, typically, the majority of the nodes can be located in an unrestricted zone and only a few restricted zones for nodes containing sensitive information are defined; (b) the edges of endpoints starting from a particular node are located in the same zone where the node is located; (c) zone boundaries are crossing edges; (d) zone boundaries do not cross other zone boundaries; and (e) zones can be located within zones, in which case these zones are hierarchically organized; the most inner zone represents the most restricted zone.

FIG. 6 shows five zones A to E. To guide the eye of the reader, nodes of each region are represented by a particular shape. It may also be noted that the zone boundaries are presented in different dashed or solid styles. It is also marked, whether the zone is an unrestricted zone or a restricted zone.

Figure 7:
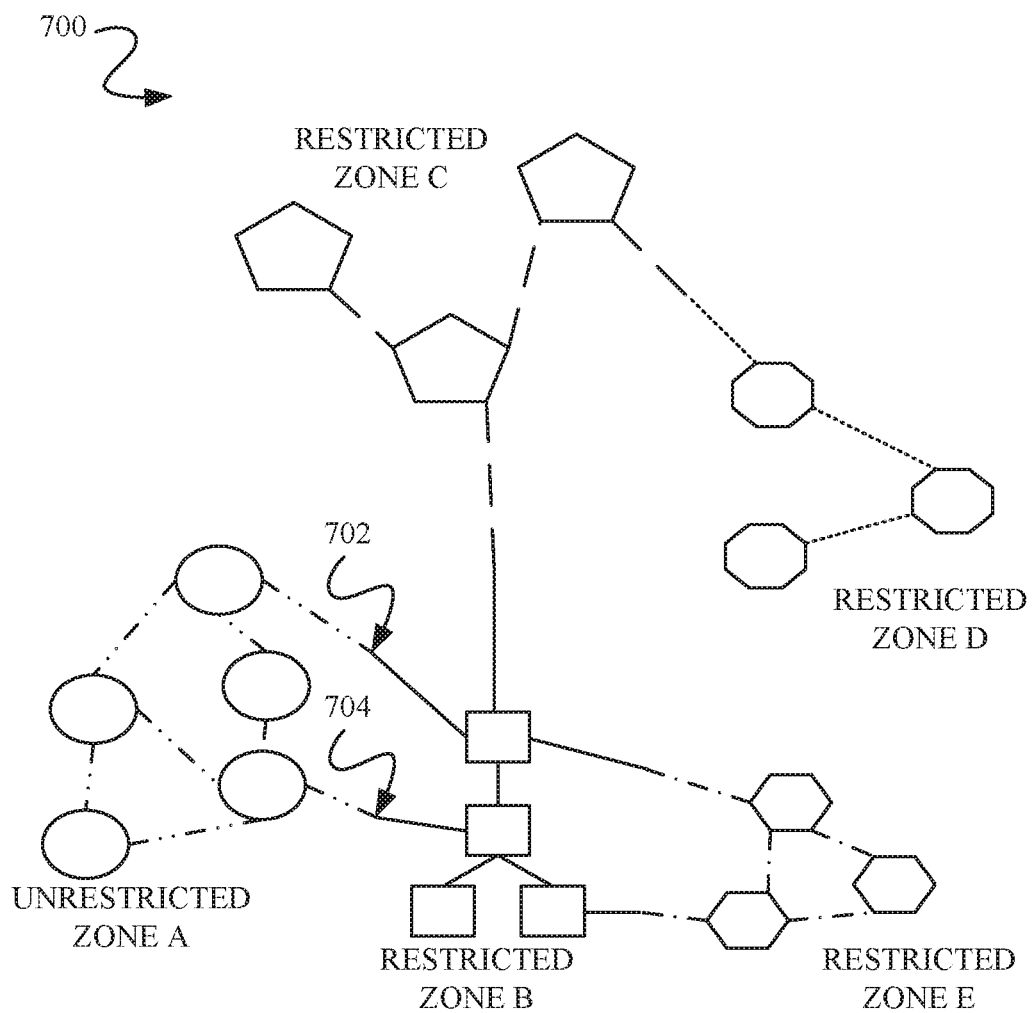
FIG. 7 shows a block diagram of the nodes of a knowledge graph with zone affiliation reflecting edges, according to embodiments of the present disclosure.

FIG. 7 shows a block diagram of the nodes of the knowledge graph 700 of FIG. 6 with zone reflecting edges. This figure shows structurally the same knowledge graph structure as FIG. 6. However, the zone boundaries are not shown and the edges are shown in the line style of the zone boundaries. This may represent that a data structure related to each edge stores an identifier of a beginning of an edge and an end of an edge. Thus, meta information about potentially different access rights can be stored in the data structure of the edges. It may also be possible to store the ACL (access control list) in each edge or a pair of access control information only with those edges crossing a zone boundary: one ACL for one zone of the zone boundary crossing and another ACL for the other zone. Although this may be one implementation option, it may represent storage of redundant information. An improved implementation is shown in the context of the next figure.

Figure 8:
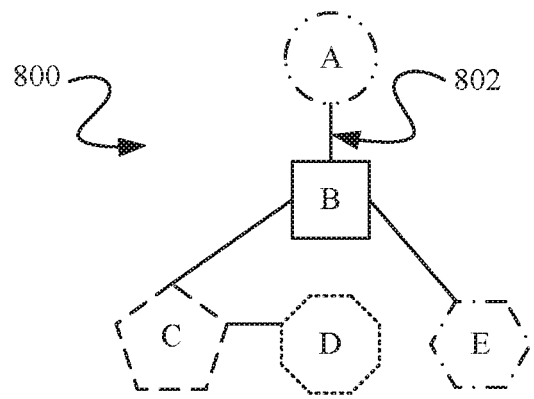
FIG. 8 shows a block diagram of an access graph relating to a knowledge graph, according to embodiments of the present disclosure.

FIG. 8 shows a block diagram of an access graph 800 relating to the knowledge graph 700 according to FIG. 7. Here, each of the zones A, B, C, D, E is represented by an access node of an access graph representing the entirety of nodes of the knowledge graph. The access edges of the access graph represent one or a plurality of edges of the knowledge graph crossing a zone boundary. For example, the access edge 802 represents the two edges 702, 704 of the knowledge graph 700 of FIG. 7. Thereby, the round access node A of FIG. 8 represents the complete group of round nodes of the knowledge graph 700 of the unrestricted zone A.

In the same way, the square access node B of the access graph 800 represents the group of square nodes in the restricted zone B of knowledge graph 700 of FIG. 7. A skilled person is able to map this example to the other zones and nodes of the knowledge graph and the access graph. It may be noted, that the access graph may also be denoted as 'access map knowledge graph'. Thus, the general principles of the knowledge graph itself is also used for managing access rights in the knowledge graph itself without storing the access rights within the knowledge graph but in a separate condensed knowledge graph structure denoted as an access graph.

The ACLs to nodes in zones of the knowledge graph may be stored in the access edges of the access graph. Principally, two ACLs, one for each access node of the access graph, are stored in a data structure relating to each access edge of the access graph. In order to save even more storage space, it may also be possible to store the access right of a group of nodes of the knowledge graph together with the representing access node of the access graph. However, this would mean having to access the access node in order to determine the access right. When the access right to a node in the zone represented by the access node is stored in the access edge, an access to the access node may not be required and thus the performance may be improved.

It may be noted that the access graph supports the selection of a proper access path, as typically more than one path along the edges is possible. Furthermore, the nodes of the access graph comprise an index of the zone nodes of the original knowledge graph.

It may now be considered that a user or a process has access rights to zones A, B, C, and D, but not to E. The process, e.g., a search process, may follow the path of "the lowest cost" defined by weights of the edges of the knowledge graph. Assuming the process starts in zone A, it may continue through zone B and attempt to enter zone E, as the southern border of the path is assumed to be the one of the lowest cost (the shorter path). The system would then interrupt the process as access rights to zone E were not granted and zone E is an isolated area.

A determination of the fact that no access rights exist may be performed as follows: the process tries to cross the zone boundary via an edge to the restricted zone E and determines that a zone boundary is crossed. In this case, the process refers to the access graph (compare FIG. 8), accesses the ACL relating to the restricted zone E and is refused access to one of the nodes of zone E. Then, the system lets the process resume at the last node accessed before the attempt to enter the zone E. The path with the next lowest cost points upwards (north) to zone C (without accessing the node content) as access rights to zone D were granted (as determined by an access to the related access edge of the related access graph) and a path exists from the node in zone B via a node in zone C to a node in zone D in the access graph, and thus also in the knowledge graph itself.

Figure 9:
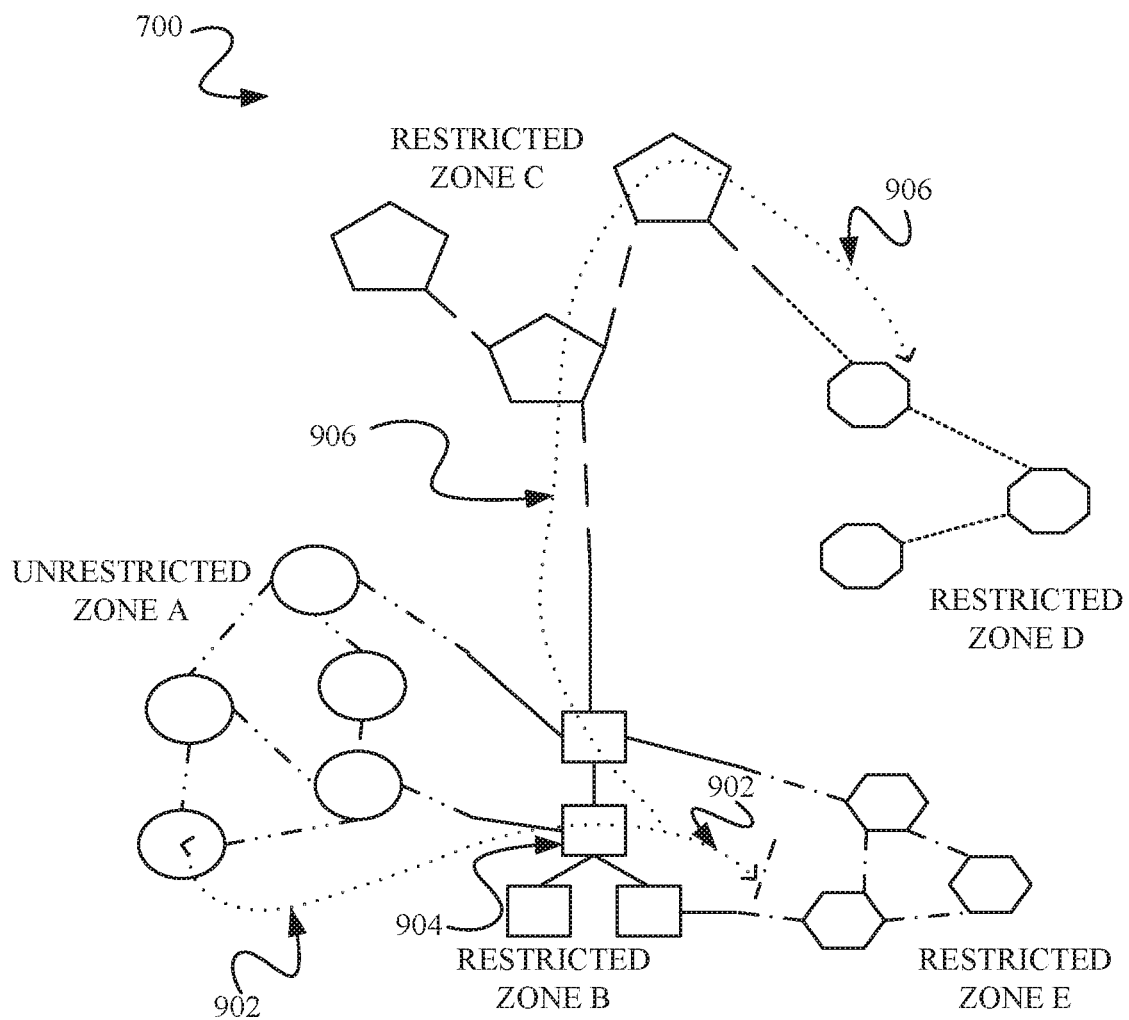
FIG. 9 shows a block diagram of a modified knowledge graph with a new node, according to embodiments of the present disclosure.
Figure 10:
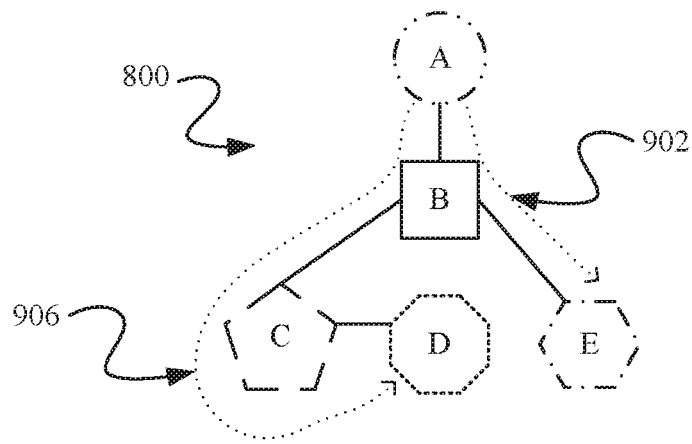
FIG. 10 shows a block diagram of a modified access graph reflecting a modification to a knowledge graph, according to embodiments of the present disclosure.

In such a way, the system supports the process on the one hand by avoiding un-allowed operations in zone E and, on the other hand, it allows using a preferred path to zone D via zone C. This is also illustrated in FIG. 9 in which the dotted line 902 shows the initial path to zone E. However, because zone E is a restricted zone to which the user does not have access rights, the process turns back to the last node 904 of zone B and continues—compare dotted line 906—via nodes in zone C to restricted zone D. This is also shown in the context of the access graph in FIG. 10. It may be noted that FIG. 9 and FIG. 10 correspond to FIG. 7 and FIG. 8.

FIG. 7 and FIG. 8 may also be helpful to discuss changes to the knowledge graph. Certain modifications to the knowledge graph also require changes to the access rights stored in the access edges of the access graph. The system and related method may handle these changes in the following way:

(1) Addition of nodes to the knowledge graph. According to the access rights required, new nodes must be placed in the proper zone. As the access rights are defined on the edges of the access graph, the placement of the ACL on the access edge happens with the addition of the first node and a related edge in a new zone.

(2) Addition of edges to the knowledge graph. When the first edge of a kind, connecting a node in zone X with another node in zone Y, is added to the knowledge graph, a corresponding access edge must be added to the access graph (shown in the next figure).

Figure 11:
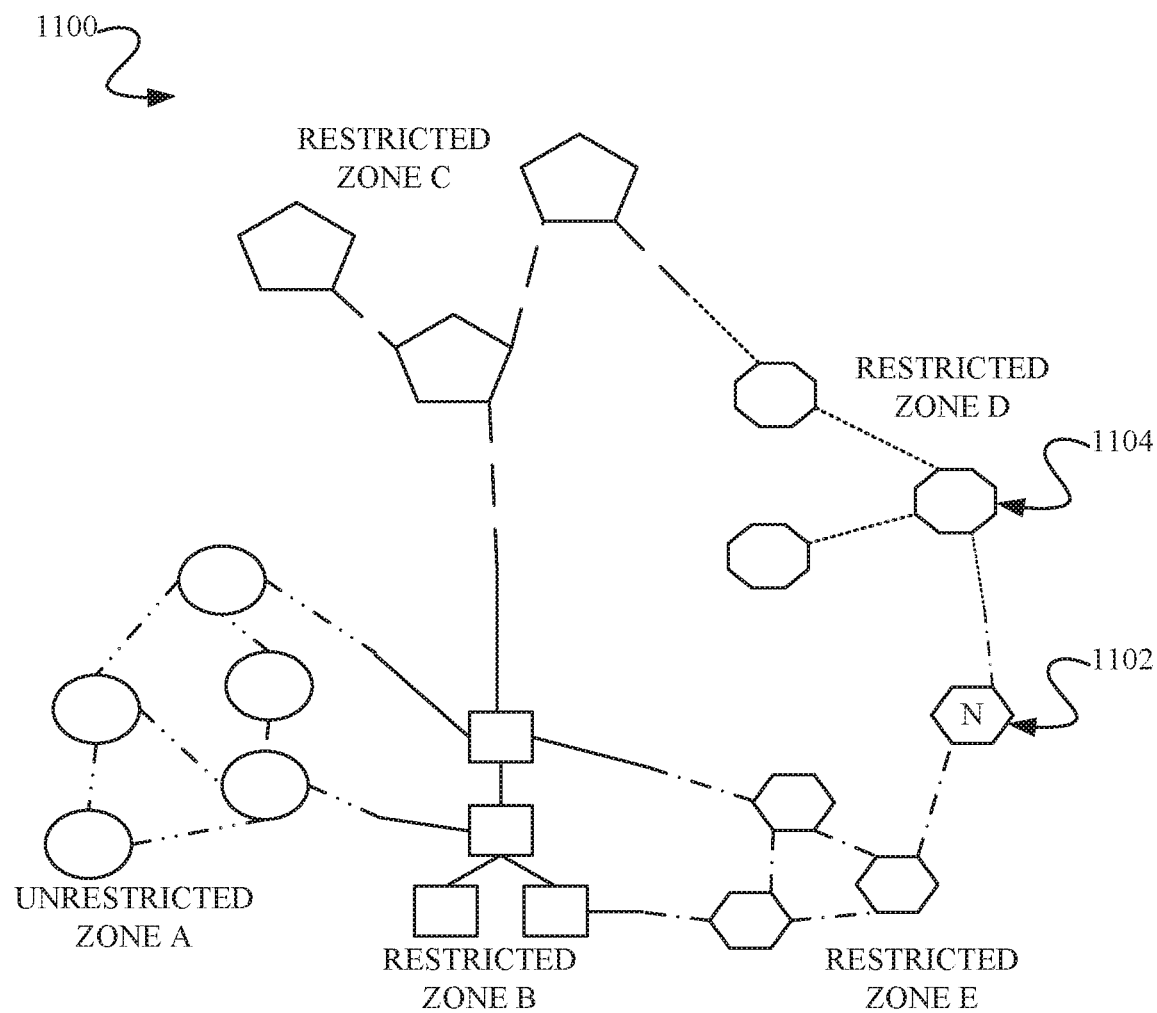
FIG. 11 shows a block diagram of a knowledge graph in which a node with its related edges has been removed, according to embodiments of the present disclosure.
Figure 12:
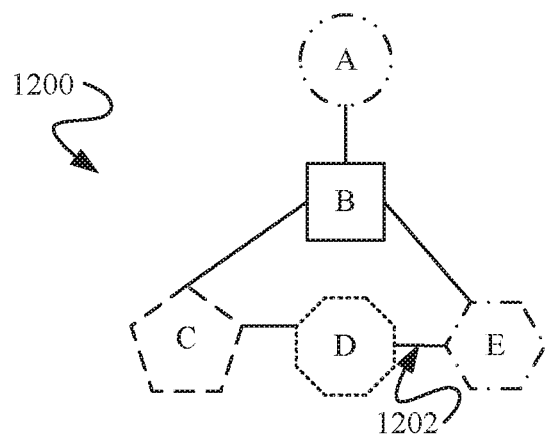
FIG. 12 shows a block diagram of an embodiment of an access graph reflecting a change in a knowledge graph, according to embodiments of the present disclosure.

FIG. 11 shows a block diagram of modified knowledge graph 1100, modified from knowledge graph 700 (of FIG. 7) by the addition of a new node N 1102. In this example, the new node N of the knowledge graph is added to the restricted zone D as the end of the edges connecting to the node N are configured with the access rights for the restricted zone E (shown as a dot-dash line). One newly added edge connects the new node N 1102 with a node 1104 in the restricted zone D. Hence, the access graph has to be updated by adding an edge between access node D and access node E, as shown in FIG. 12, showing the updated access graph 1200 with new edge 1202.

Figure 13:
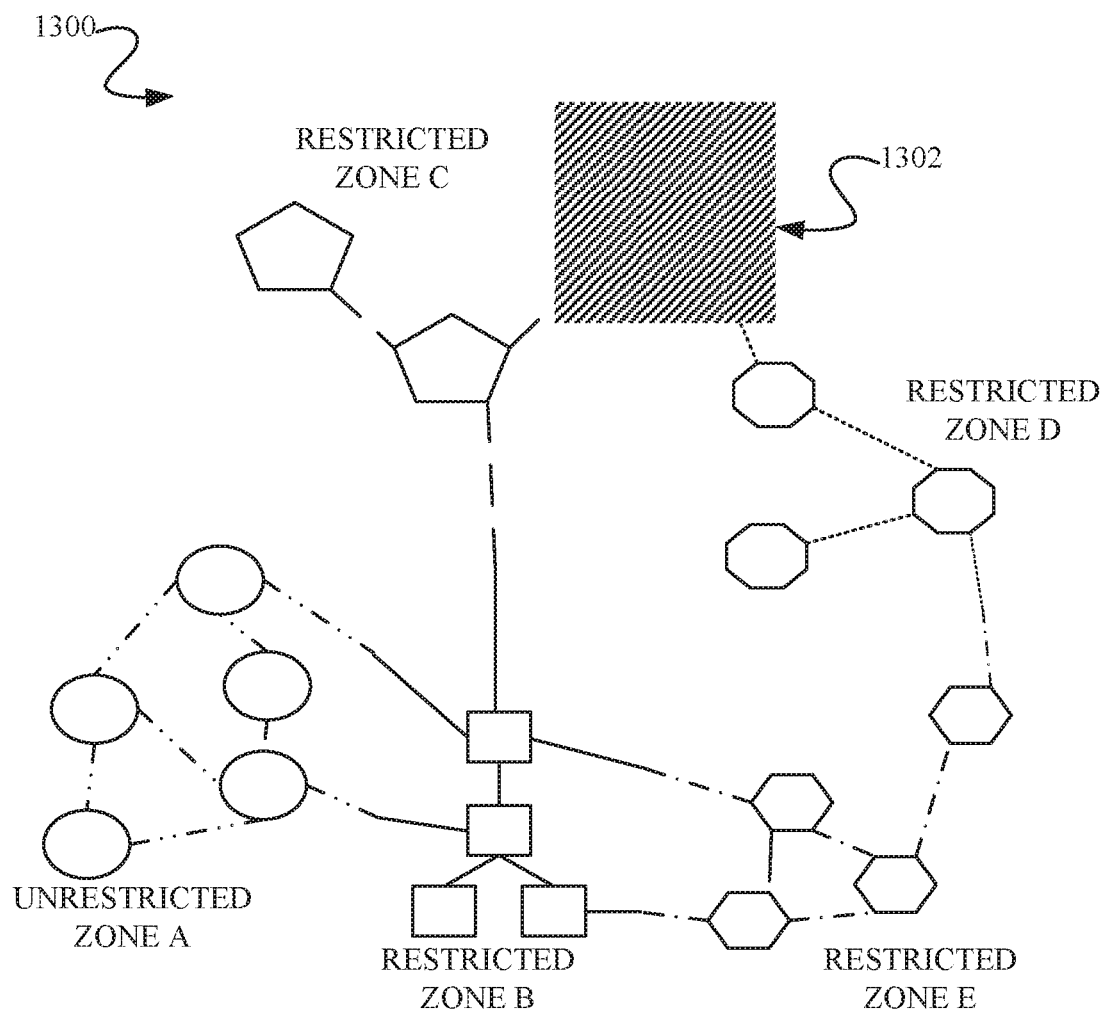
FIG. 13 shows the block diagram of nodes of a knowledge graph illustrating a walk through the knowledge graph reflecting a restricted zone, according to embodiments of the present disclosure.

FIG. 13 shows an example 1300 for a removal of a node and the only connecting edge between two zones. The striped area 1302 may represent a removal of a node of the restricted zone C and the relating edges within the restricted zone C and another edge crossing the boundary to the restricted zone D. Such changes must also be reflected in the access graph as shown in the next figure.

It may also be noted that changes of the structure of the knowledge graph (moving edges) can be addressed: This change case is constructed out of the two change cases "addition" and "removal" of edges.

Figure 14:
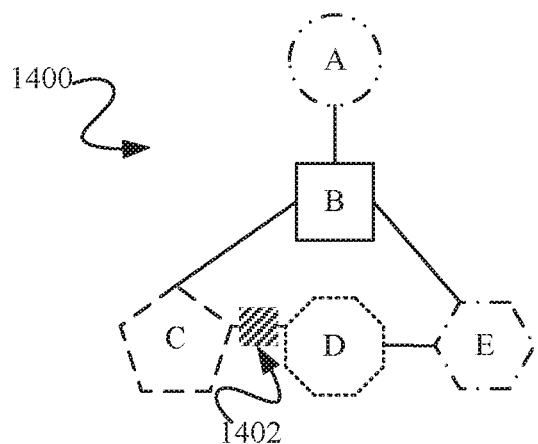
FIG. 14 shows a block diagram of an access graph relating to a knowledge graph, according to embodiments of the present disclosure.

FIG. 14 shows a block diagram of an embodiment of the access graph 1400 reflecting the change in the knowledge graph according to FIG. 13. As can easily be seen, a striped area 1402 is laid over the access edge between access node C and access node D. Consequently, this access edge has to be removed.

Figure 15:
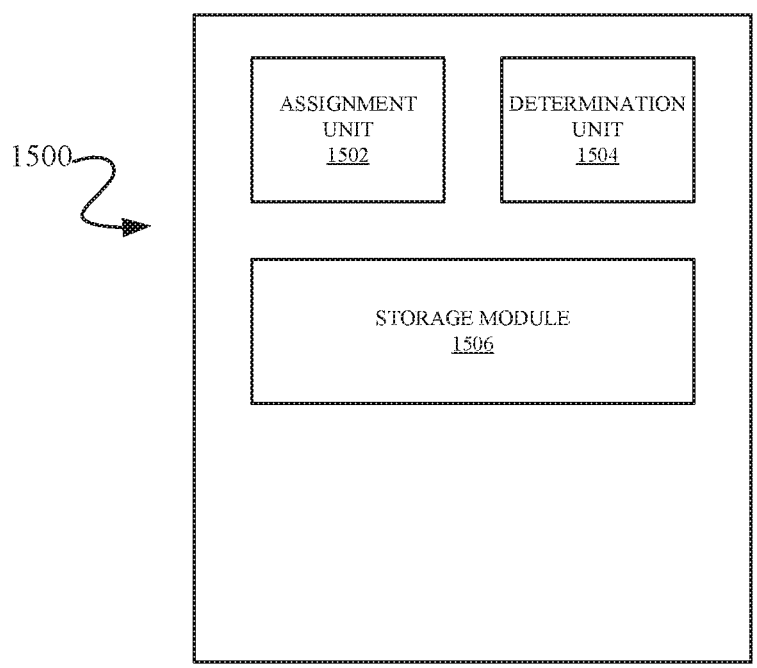
FIG. 15 shows a block diagram of a system for controlling access in a knowledge graph comprising nodes and edges, according to embodiments of the present disclosure.

FIG. 15 shows a block diagram of the system 1500 for controlling access in the knowledge graph comprising nodes and edges. The system 1500 comprises nodes and edges, wherein the edges are connecting nodes. The system comprises an assignment unit 1502 adapted for assigning each one of the nodes of the knowledge graph to a non-intersecting zone, and a determination unit 1504 adapted for determining an access graph comprising a list of all zones of the knowledge graph. The list may have an entry related to each zone and to a list of zone-related node identifiers, indicative of nodes assigned to the one zone.

Furthermore, the system 1500 comprises a storage module 1506 adapted for storing a first zone identifier, indicative of a first zone an edge ends, and a second zone identifier, indicative of a second zone an edge ends, of an edge in a dataset related to the edge. Thereby, the access graph comprises one access node for each zone and access edges representing one or more edges between respective zones of the knowledge graph. Furthermore, the storage module 1506 is also adapted for storing a first access control list and a second access control list in each of the access edges, the first access control list relating to a first zone a first access node in the access graph relates to, and the second access control list relating to the second zone the second access node in the access graph relates to.

Figure 16:
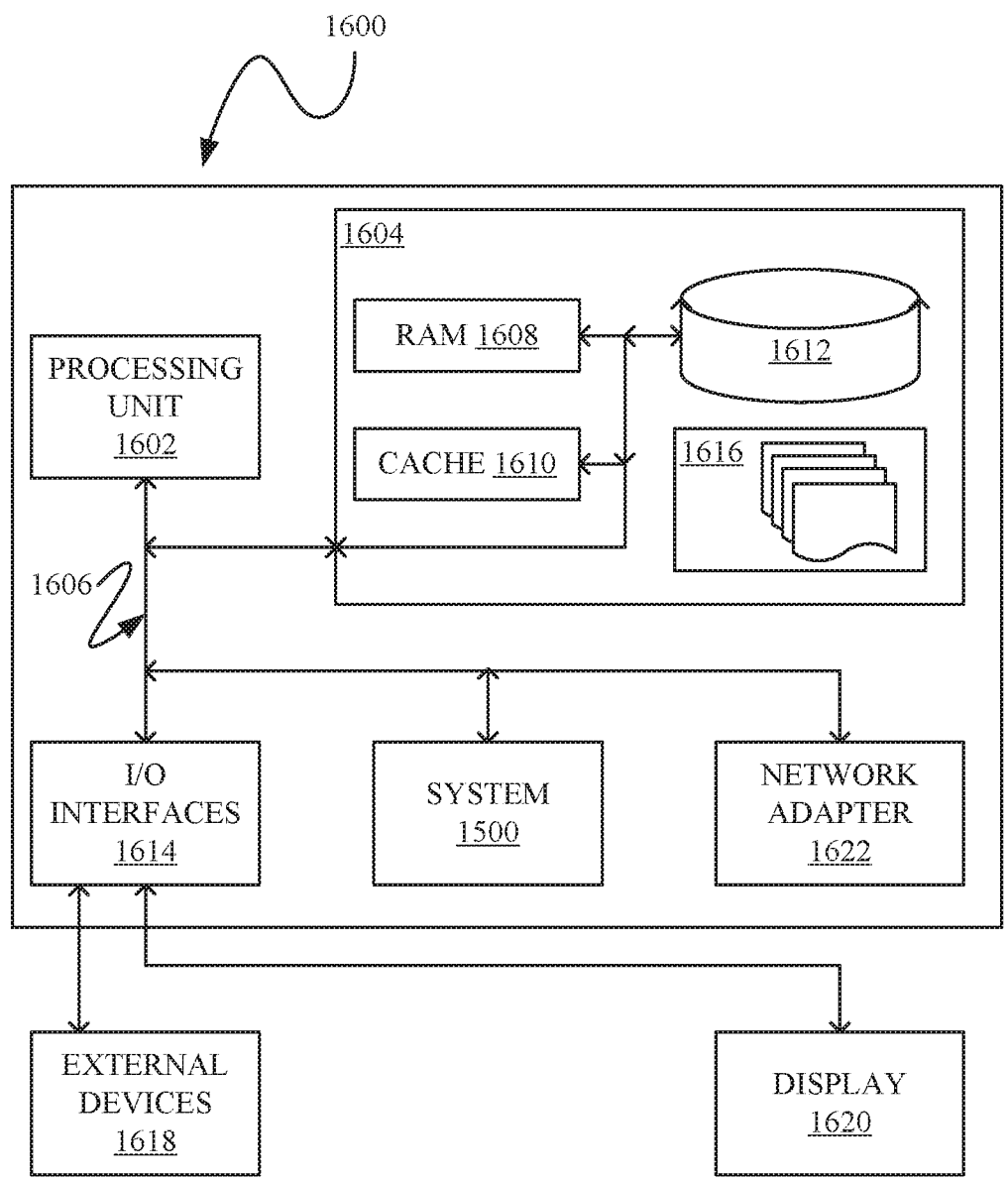
FIG. 16 shows a block diagram of a computer system comprising a system for controlling access on a knowledge graph, according to embodiments of the present disclosure.

Embodiments of the invention may be implemented together with virtually any type of computer, regardless of the platform being suitable for storing and/or executing program code. FIG. 16 shows, as an example, a computing system 1600 suitable for executing program code related to the proposed method.

The computing system 1600 is only one example of a suitable computer system and is not intended to suggest any limitation as to the scope of use or functionality of embodiments of the invention described herein, regardless, whether the computer system 1600 is capable of being implemented and/or performing any of the functionality set forth hereinabove. In the computer system 1600, there are components, which are operational with numerous other general purpose or special purpose computing system environments or configurations. Examples of well-known computing systems, environments, and/or configurations that may be suitable for use with computer system/server 1600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1600 may be described in the general context of computer system-executable instructions, such as program modules, being executed by a computer system 1600. Generally, program modules may include routines, programs, objects, components, logic, data structures, and so on that perform particular tasks or implement particular abstract data types. Computer system/server 1600 may be practiced in distributed cloud computing environments where tasks are performed by remote processing devices that are linked through a communications network. In a distributed cloud computing environment, program modules may be located in both, local and remote computer system storage media including memory storage devices.

As shown in the figure, computer system/server 1600 is shown in the form of a general-purpose computing device. The components of computer system/server 1600 may include, but are not limited to, one or more processors or processing units 1602, a system memory 1604, and a bus 1606 that couples various system components, including system memory 1604 to the processor 1602. Bus 1606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1600 typically includes a variety of computer system readable media. Such media may be any available media that is accessible by computer system/server 1600, and it includes both, volatile and non-volatile media, removable and non-removable media.

The system memory 1604 may include computer system readable media in the form of volatile memory, such as random access memory (RAM) 1608 and/or cache memory 1610. Computer system/server 1600 may further include other removable/non-removable, volatile/non-volatile computer system storage media. By way of example only, a storage system 1612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1606 by one or more data media interfaces. As will be further depicted and described below, memory 1604 may include at least one program product having a set (e.g., at least one) of program modules that are configured to carry out the functions of embodiments of the invention.

The program/utility, having a set (at least one) of program modules 1616, may be stored in memory 1604 by way of example, and not limiting, as well as an operating system, one or more application programs, other program modules, and program data. Each of the operating systems, one or more application programs, other program modules, and program data or some combination thereof, may include an implementation of a networking environment. Program modules 1616 generally carry out the functions and/or methodologies of embodiments of the invention, as described herein.

The computer system/server 1600 may also communicate with one or more external devices 1618 such as a keyboard, a pointing device, a display 1620, etc.; one or more devices that enable a user to interact with computer system/server 1600; and/or any devices (e.g., network card, modem, etc.) that enable computer system/server 1600 to communicate with one or more other computing devices. Such communication can occur via Input/Output (I/O) interfaces 1614. Still yet, computer system/server 1600 may communicate with one or more networks such as a local area network (LAN), a general wide area network (WAN), and/or a public network (e.g., the Internet) via network adapter 1622. As depicted, network adapter 1622 may communicate with the other components of computer system/server 1600 via bus 1606. It should be understood that although not shown, other hardware and/or software components could be used in conjunction with computer system/server 1600. Examples, include, but are not limited to: microcode, device drivers, redundant processing units, external disk drive arrays, RAID systems, tape drives, and data archival storage systems, etc.

Additionally, the system for controlling access in a knowledge graph 1500 may be attached to the bus system 1606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another devices to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for controlling access in a knowledge graph, the method comprising:
   assigning each node in a knowledge graph to a zone of one or more non-intersecting zones, the knowledge graph comprising two or more nodes and one or more edges, each of the one or more edges connecting two of the two or more nodes;
   determining an access graph comprising an access node for each zone and access edges representing one or more edges between the one or more non-intersecting zones, the access graph further comprising a first list of the one or more non-intersecting zones, the first list comprising one or more entries, each entry related to a zone and to a second list of node identifiers, each node identifier indicative of a node assigned to the zone;
   storing a first zone identifier indicative of a first zone that is occupied by a first node where an edge ends and a second zone identifier indicative of a second zone that is occupied by a second node where the edge ends;
   storing a first access control list and a second access control list in each access edge, the first access control list relating to a first zone where an access edge ends and to which a first access node in the access graph relates, and the second access control list relating to a second zone where the access edge ends to which a second access node in said access graph relates;
   identifying a starting node on the knowledge graph;
   identifying a target node on the knowledge graph; and
   determining a path of the lowest cost between the starting node and the target node, wherein the determining is based on a set of weights of a set of edges between the starting node and the target node.

2. The method of claim 1, further comprising:
   determining an access right to the target node, when a knowledge graph edge in a path to the target node crosses a zone border, by referring to an access edge in the access graph relating to the knowledge graph edge; and determining the access right to the target node of the knowledge graph by referring to a corresponding access control list stored in the access edge of the access graph relating to a zone containing the target node of the knowledge graph.

3. The method of claim 1, further comprising adding a new node to the access graph by:

identifying, in the knowledge graph, one or more edges relating to the new node;

identifying, in the knowledge graph, each node related to the one or more edges;

determining that all nodes relating to the one or more edges belong to one zone; and adding a node identifier indicative of the new node to the second list of nodes related to the one zone.

4. The method of claim 3, further comprising:

determining that a new edge of the new node crosses a zone border to a second zone;

determining no access edge exists between the one zone of the new node and the second zone; and adding an access edge to the access graph between a first access node relating to the one zone and a second access node related to the second zone.

5. The method of claim 3, further comprising:

determining there is only one edge between a first zone and a second zone of the knowledge graph;

determining the one edge is to be removed from the knowledge graph; and removing a corresponding access edge from the access graph between a first access node representing the first zone and a second access node representing the second zone.

6. The method of claim 3, wherein one access edge of the access graph is related to a plurality of edges between nodes of two zones of the knowledge graph.

7. The method of claim 1, wherein a first zone lies within a second zone.

8. The method of claim 1, wherein a change in a structure of the knowledge graph is treated as a removal of an edge and an adding of an edge.

9. The method of claim 1, further comprising:

determining no access rights exist to the target node when starting from a starting node connected via an edge to the target node; and accessing another node via another edge with a next lowest cost points when compared to the cost points associated with the edge to the target node for which no access rights exist.

10. A system for controlling access in a knowledge graph, the system comprising:

an assignment unit adapted for assigning each node in a knowledge graph to a zone of one or more non-intersecting zones, the knowledge graph comprising two or more nodes and one or more edges, each of the one or more edges connecting two of the two or more nodes;

a determination unit adapted for determining an access graph comprising an access node for each zone and access edges representing one or more edges between the one or more non-intersecting zones, the access graph further comprising a first list of the one or more non-intersecting zones, the first list comprising one or more entries, each entry related to a zone and to a second list of node identifiers, each node identifier indicative of a node assigned to the zone; and a storage module adapted for storing a first access control list and a second access control list in each access edge, the first access control list relating to a first zone where an access edge ends and to which a first access node in the access graph relates, and the second access control list relating to a second zone where the access edge ends to which a second access node in said access graph relates;

wherein the determining unit is further adapted for:

identifying a starting node on the knowledge graph;

identifying a target node on the knowledge graph; and determining a path of the lowest cost between the starting node and the target node, wherein the determining is based on a set of weights of a set of edges between the starting node and the target node.

11. The system of claim 10, further comprising an access right determination unit adapted for:

determining an access right to the target node, when a knowledge graph edge in a path to the target node crosses a zone border, by referring to an access edge in the access graph relating to the knowledge graph edge; and determining the access right to the target node of the knowledge graph by referring to a corresponding access control list stored in the access edge of the access graph relating to a zone containing the target node of the knowledge graph.

12. The system of claim 10, further comprising an adding unit adapted for adding a new node to the knowledge graph, wherein said adding unit is adapted for:

identifying, in the knowledge graph, one or more edges relating to the new node;

identifying, in the knowledge graph, each node related to the one or more edges;

determining that all nodes relating to the one or more edges belong to one zone; and adding a node identifier indicative of the new node to the second list of nodes related to the one zone.

13. The system of claim 12, further comprising an access edge adding unit adapted for:

determining that a new edge of the new node crosses a zone border to a second zone;

determining no access edge exists between the one zone of the new node and the second zone; and adding an access edge to the access graph between a first access node relating to the one zone and a second access node related to the second zone.

14. The system of claim 12, further comprising an edge removal unit adapted for:

determining there is only one edge between a first zone and a second zone of the knowledge graph;

determining the one edge is to be removed from the knowledge graph; and removing a corresponding access edge from the access graph between a first access node representing the first zone and a second access node representing the second zone.

15. The system of claim 12, wherein one access edge of the access graph is related to a plurality of edges between nodes of two zones of the knowledge graph.

16. The system of claim 10, wherein a first zone lies within a second zone.

17. The system of claim 10, wherein a change in a structure of the knowledge graph is treated as a removal of an edge and an adding of an edge.

18. The system of claim 10, the determination unit further adapted for:
- determining no access rights exist to the target node when starting from a starting node connected via an edge to the target node;
- accessing another node via another edge with a next lowest cost points when compared to the cost points associated with the edge to the target node for which no access rights exist.

19. A computer program product for controlling access in a knowledge graph, the computer program product comprising a computer readable storage medium having program instructions embodied therewith, wherein the computer readable storage medium is not a transitory signal per se, the program instructions executable by a processor to perform a method comprising:
- assigning each node in a knowledge graph to a zone of one or more non-intersecting zones, the knowledge graph comprising two or more nodes and one or more edges, each of the one or more edges connecting two of the two or more nodes;
- determining an access graph comprising an access node for each zone and access edges representing one or more edges between the one or more non-intersecting zones, the access graph further comprising a first list of the one or more non-intersecting zones, the first list comprising one or more entries, each entry related to a zone and to a second list of node identifiers, each node identifier indicative of a node assigned to the zone;
- storing a first access control list and a second access control list in each access edge, the first access control list relating to a first zone where an access edge ends and to which a first access node in the access graph relates, and the second access control list relating to a second zone where the access edge ends to which a second access node in said access graph relates;
- identifying a starting node on the knowledge graph;
- identifying a target node on the knowledge graph; and
- determining a path of the lowest cost between the starting node and the target node, wherein the determining is based on a set of weights of a set of edges between the starting node and the target node.

* * * * *